United States Patent
Islam et al.

(10) Patent No.: US 6,239,903 B1
(45) Date of Patent: May 29, 2001

(54) NONLINEAR FIBER AMPLIFIERS FOR A 1430-1530NM LOW-LOSS WINDOW IN OPTICAL FIBERS

(75) Inventors: Mohammed Nazrul Islam, Ann Arbor; Hayden Henry Harris, Chelsea, both of MI (US)

(73) Assignees: Xtera Communications, Inc., Richardson, TX (US); Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/558,300

(22) Filed: Apr. 25, 2000

Related U.S. Application Data

(62) Division of application No. 09/046,900, filed on Mar. 24, 1998, now Pat. No. 6,101,024.

(51) Int. Cl.[7] .......................... H01S 3/067; H01S 3/0933
(52) U.S. Cl. ...................... 359/337; 359/160; 359/341; 372/3; 372/6
(58) Field of Search ......................... 359/124, 160, 359/334, 337, 341, 349; 372/3, 6, 70

(56) References Cited

U.S. PATENT DOCUMENTS

| | | | |
|---|---|---|---|
| 4,923,291 | * 5/1990 | Edagawa et al. | 359/337 |
| 5,689,596 | * 11/1997 | Evans | 385/27 |
| 5,689,598 | 11/1997 | Evans | 385/27 |

FOREIGN PATENT DOCUMENTS

739497 * 1/1997 (JP) .

OTHER PUBLICATIONS

Ohishi et al, Proc. 1998. 11th Ann. mtg of et al IEEE Lasers & Electrooptics Society, vol. 11, pp. 194–195, Dec. 4, 1998.*

Chee et al, IEEE J. Q. E., vol. 26 # 3, pp. 541–549, Mar. 1990.*

Stolen et al, IEEE J. Q. E., vol. 18, # 7, pp. 1062–1072, Jul. 1982.*

(List continued on next page.)

*Primary Examiner*—Nelson Moskowitz
(74) *Attorney, Agent, or Firm*—Wilson Sonsini Goodrich & Rosati

(57) ABSTRACT

An apparatus and method are described for exploiting almost the full almost 25 THz of bandwidth available in the low-loss window in optical fibers (from 1430 nm to 1620 nm) using a parallel combination of optical amplifiers. The low-loss window at about 1530 nm–1620 nm can be amplified using erbium-doped fiber amplifiers (EDFAs). However, due to the inherent absorption of the erbium at shorter wavelengths, EDFAs cannot be used below about 1525 nm without a significant degradation in performance. For the low-loss window at approximately 1430–1530 nm, amplifiers based on nonlinear polarization in optical fibers can be used effectively. A broadband nonlinear polarization amplifier (NLPA) is disclosed which combines cascaded Raman amplification with parametric amplification or four-wave mixing. In particular, one of the intermediate cascade Raman order wavelengths $\lambda_r$ should lie in close proximity to the zero-dispersion wavelength $\lambda_0$ of the amplifying fiber. For this intermediate Raman order, spectral broadening will occur due to phase-match with four-wave mixing (if $\lambda_r < \lambda_0$) or phase-matched parametric amplification (if $\lambda_r > \lambda_0$). In further cascaded Raman orders, the gain spectrum will continue to broaden due to the convolution of the gain spectrum with the spectrum from the previous Raman order.

23 Claims, 8 Drawing Sheets

OTHER PUBLICATIONS

Yamada et al, Electronics Letters, vol. 33, # 8, pp. 710–711, Apr. 10, 1997.*

Chee et al, IEEE Journal of Quantum Electronics, vol. 26, # 3, pp. 541–549, Mar. 1990.*

Grobavsky et al, Optical Engineering, vol. 34, # 4, pp. 1016–1018, Apr. 1995.*

Stolen et al., "Parametric Amplification and Frequency Conversion in Optical Fibers," IEEE Journal of Quantum Electronics, Jul. 1982, vol. QE–18, No. 7, pp. 1062–1072.

Agrawal, G.P., "Stimulated Raman Scattering," Chapter 8 and "Parametric Processes" Chapter 10 of Nonlinear Fiber Optics, 1989.

Yamada et al., "Broadband and gain–flattened amplifer composes of a 1.55µm–band and a 1.58µm–band doped fiber amplifer in a parallel configuration, " Electronics Letters, Apr. 10, 1997, vol. 33, No. 8, pp. 710–711.

Masuda et al., Wideband, gain–flattened, erbium–doped fibre amplifiers with 3dB bandwidths of )50nm.

Wysockl et al., "Broad–Band Erbium–Doped Fiber Amplifiers Flattened Beyond 40 nm Using Long Period Grating Filter,"0 IEEE Photonics Technology Letters, Oct. 1997, vol. 9, No. 10, pp. 1343–1345.

Sun et al., "80nm ultra–wideband erbium–doped silica fibre amplifier," Nov. 6, 1997, vol. 33, No.23, pp. 1965–1967.

* cited by examiner $2g_{PEAK} = \gamma P$
$\Delta k_{PEAK} = -2\gamma P$
$\Delta k_{MAX} = -4\gamma P$

NONLINEAR FIBER AMPLIFIERS FOR A 1430-1530NM LOW-LOSS WINDOW IN OPTICAL FIBERS

CROSS-REFERENCE TO RELATED APPLICATIONS

This application is a divisional of U.S. patent application Ser. No. 09/046,900, filed Mar. 24, 1998, issued Aug. 8, 2000 as U.S. Pat. No. 6,101,024, entitled Nonlinear Polarization Amplifiers Used for a 1430–1530 nm Low-Loss Window in Optical Fibers, naming inventors Mohammed N. Islam and Hayden H. Harris, which application is fully incorporated herein by reference.

FIELD OF THE INVENTION

The present invention relates generally to optical amplifiers used in fiber-optics for telecommunications, cable television and other fiber-optics applications. More particularly, the invention relates to an optical fiber amplifier and method for producing an amplified broadband output from an optical signal having a wavelength in the range of 1430–1530 nm.

BACKGROUND OF THE INVENTION

Because of the increase in data intensive applications, the demand for bandwidth in communications has been growing tremendously. In response, the installed capacity of telecommunication systems has been increasing by an order of magnitude every three to four years since the mid 1970s. Much of this capacity increase has been supplied by optical fibers that provide a four-order-of-magnitude bandwidth enhancement over twisted-pair copper wires.

To exploit the bandwidth of optical fibers, two key technologies have been developed and used in the telecommunication industry: optical amplifiers and wavelength-division multiplexing (WDM). Optical amplifiers boost the signal strength and compensate for inherent fiber loss and other splitting and insertion losses. WDM enables different wavelengths of light to carry different signals parallel over the same optical fiber. Although WDM is critical in that it allows utilization of a major fraction of the fiber bandwidth, it would not be cost-effective without optical amplifiers. In particular, a broadband optical amplifier that permits simultaneous amplification of many WDM channels is a key enabler for utilizing the full fiber bandwidth.

Silica-based optical fiber has its lowest loss window around 1550 nm with approximately 25 THz of bandwidth between 1430 and 1620 nm. For example, FIG. 1 illustrates the loss profile of a 50 km optical fiber. In this wavelength region, erbium-doped fiber amplifiers (EDFAs) are widely used. However, as indicated in FIG. 2, the absorption band of a EDFA nearly overlaps its the emission band. For wavelengths shorter than about 1525 nm, erbium-atoms in typical glasses will absorb more than amplify. To broaden the gain spectra of EDFAs, various dopings have been added. For example, as shown in FIG. 3a, codoping of the silica core with aluminum or phosphorus broadens the emission spectrum considerably. Nevertheless, as depicted in FIG. 3b, the absorption peak for the various glasses is still around 1530 nm.

Hence, broadening the bandwidth of EDFAs to accommodate a larger number of WDM channels has become a subject of intense research. As an example of the state-of-the-art, Y. Sun et al. demonstrated in Electronics Letters, Vol. 33, No. 23, pp. 1965–67 (1997), a two-band architecture for an ultra-wideband EDFA with a record optical bandwidth of 80 nm. To obtain a low noise figure and high output power, the two bands share a common first gain section and have distinct second gain sections. The 80 nm bandwidth comes from one amplifier (so-called conventional band or C-band) from 1525.6 to 1562.5 nm and another amplifier (so-called long band or L-band) from 1569.4 to 1612.8 nm. As another example, M. Yamada et al. reported in Electronics Letters, Vol. 33, No. 8, pp. 710–711 (1997), a 54 nm gain bandwidth achieved with two EDFAs in a parallel configuration, i.e., one optimized for 1530–1560 nm and the other optimized for 1576–1600 nm. As yet another example, H. Masuda et al. reported in Electronics Letters, Vol. 33, No. 12, pp. 1070–72 (1997), a 52 nm EDFA that used two-stage EDFAs with an intermediate equalizer.

These recent developments illustrate several points in the search for broader bandwidth amplifiers for the low-loss window in optical fibers. First, bandwidth in excess of 40–50 nm require the use of parallel combination of amplifiers even with EDFAs. Second, the 80 nm bandwidth achieved by Y. Sun et al., may be very close to the theoretical maximum. The short wavelength side at about 1525 nm is limited by the inherent absorption in erbium, and long wavelength side is limited by bend-induced losses in standard fibers at above 1620 nm. Therefore, even with these recent advances, half of the bandwidth of the low-loss window, i.e., 1430–1530 nm, remains without an optical amplifier.

SUMMARY OF THE INVENTION

It is an object of the present invention to provide an optical amplifier for a range of wavelengths between about 1430 nm and 1530 nm.

It is another object of the present invention to provide a broadband nonlinear polarization amplifier (NLPA) for generating a broadband output from an optical signal having a wavelength between about 1430 nm and 1530 nm.

It is yet another object of the present invention to provide a parallel optical amplification apparatus having a combination of the NLPA and EDFA for the almost full 25 THz bandwidth between 1430 nm and 1620 nm in the low-loss window of optical fibers.

In accordance with the invention, a broadband NLPA is implemented by using a combination of cascaded Raman amplification and either parametric amplification (PA) or four-wave mixing (4 WM) in optical fibers. To achieve the broad bandwidth, one intermediate order of the Raman cascade is arranged to be at a close proximity to the zero-dispersion wavelength of an amplifying fiber. This intermediate order phase matches PA (if its wavelength is greater than the zero-dispersion wavelength) or 4 WM (if its wavelength is less than the zero-dispersion wavelength). PA/4 WM generates sidebands and broaden the pump band. In subsequent Raman orders, the gain bandwidth is further broadened due to the convolution of the Raman gain band with the pump band. To produce an amplified broadband signal out of the NLPA of the invention, the optical signal to be amplified must have a wavelength greater than the zero-dispersion wavelength, which in turn must be greater than the pumping wavelength from a pumping means of the NLPA.

In one embodiment, a broadband NLPA employs a 1240 nm pump and an open-loop fiber with a zero-dispersion wavelength corresponding to one of the Raman orders (e.g., either 1310 nm or 1390 nm or dispersion-flattened in between). Another embodiment uses a Sagnac Raman cavity that is pumped at either 1117 nm or 1240 nm. Feedback by the Sagnac Raman cavity reduces the required pump power, and the broadband cavity design supports much of the generated bandwidth.

The present invention also relates to a parallel optical amplification apparatus having a combination of optical amplifiers. In one embodiment, the parallel optical amplification apparatus comprises two parallel stages of NLPAs with one NLPA optimized for 1430–1480 nm and the other for 1480–1530 nm. In another embodiment, the full 25 THz of the low-loss window of approximately 1430 nm to 1620 nm in optical fibers is exploited by using a parallel combination of a NLPA of the invention and a EDFA.

NLPAs have the advantage that the gain band is set by the pumping wavelengths, and gain can be provided over virtually the entire transparency region in optical fibers (i.e., between 300 nm and 2000 nm). Moreover, because NLPAs utilize inherent properties of glass fibers, NLPAs can be used even in existing fibers by modifying the terminal ends. Hence, NLPAs are fully compatible with fiber-optic systems and can take advantage of the mature fiber-optic technologies.

BRIEF DESCRIPTION OF THE DRAWINGS

These and other objects, features and elements of the present invention will be better understood from the following detailed description of preferred embodiments of the invention in which.

DETAILED DESCRIPTION OF PREFERRED EMBODIMENTS

Figure 1:
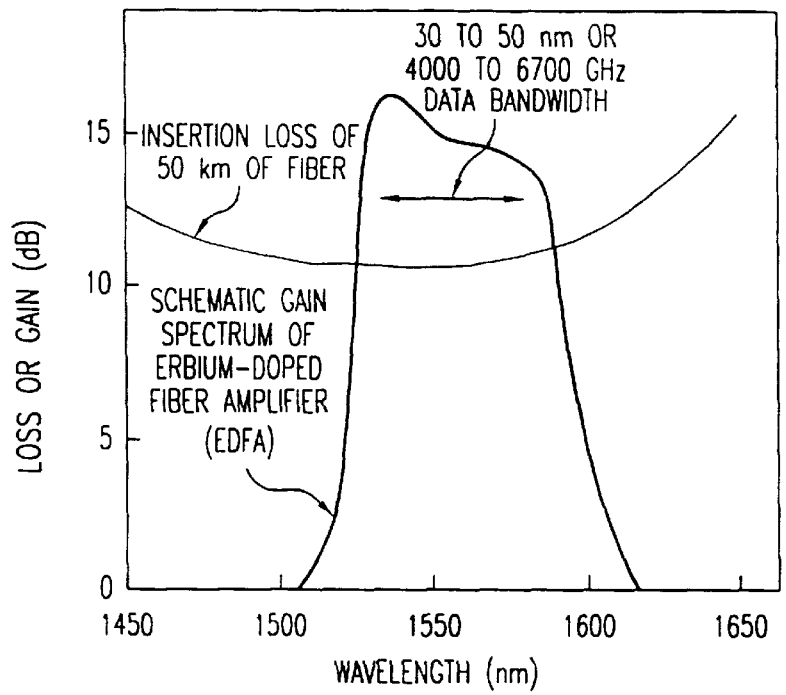
FIG. 1 depicts the loss profile of a 50 km fiber and the gain band of a typical EDFA.
Figure 2:
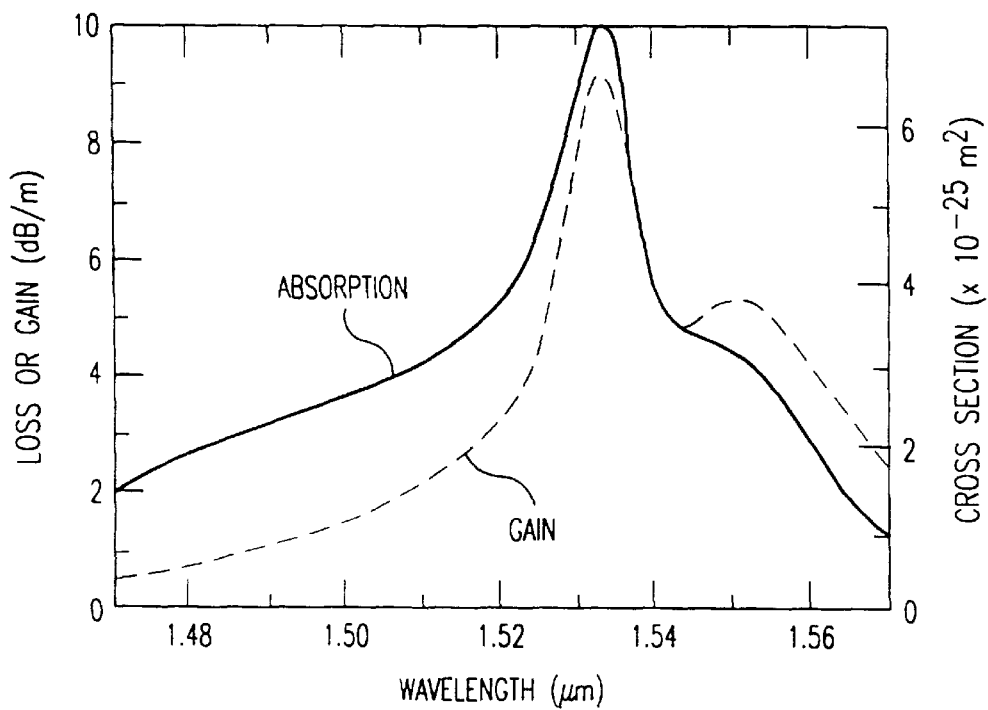
FIG. 2 depicts absorption and gain spectra of an EDFA.
Figure 3A:
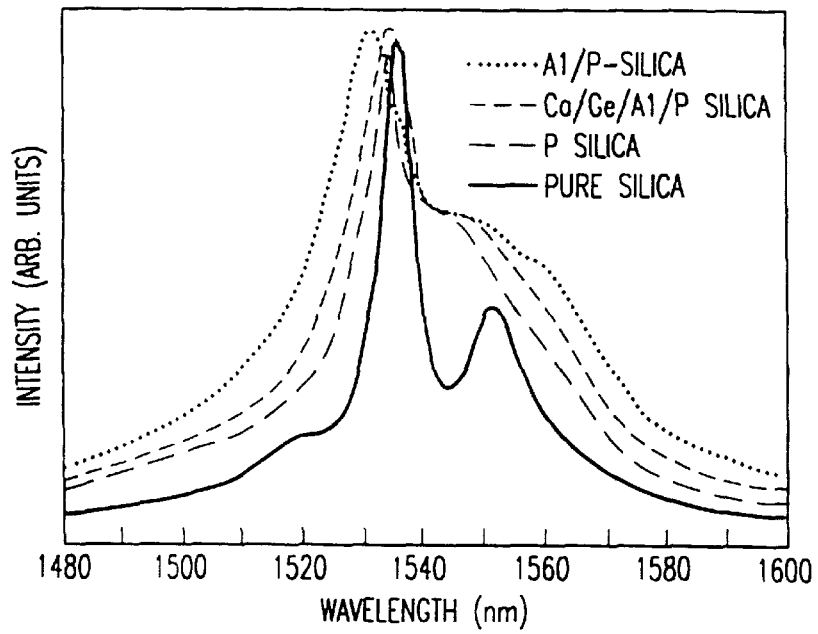
FIG. 3a depicts emission spectra of four EDFAs with different core compositions.
Figure 3B:
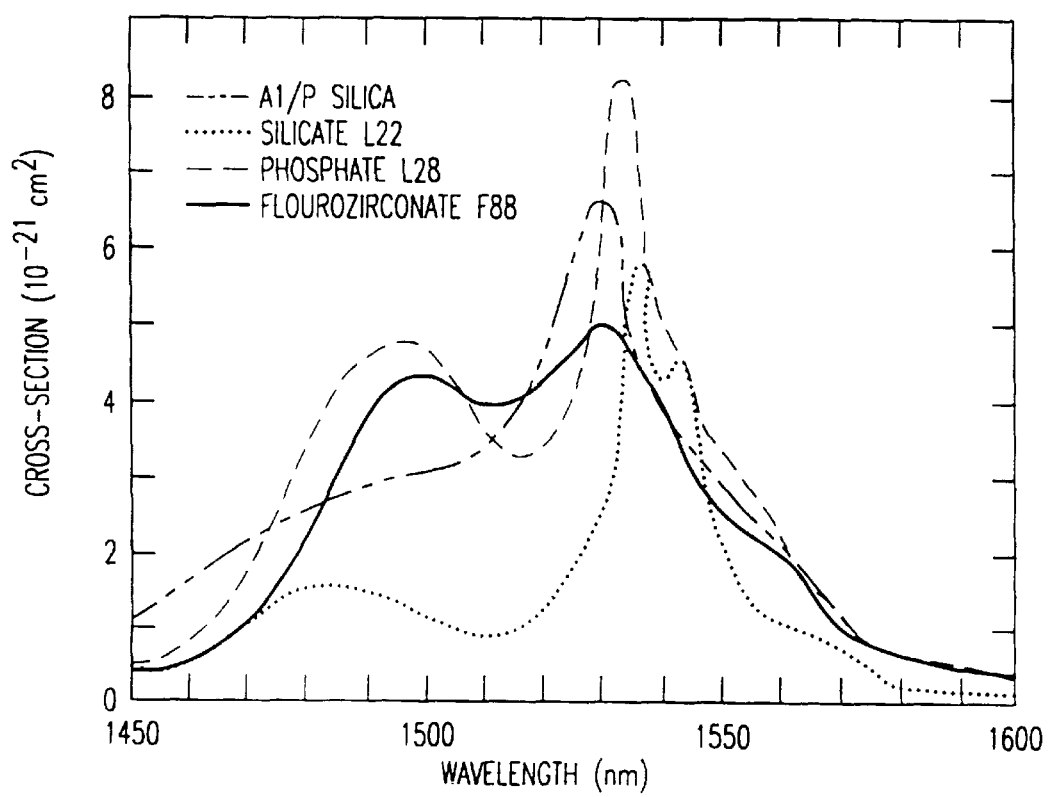
FIG. 3b depicts absorption cross-section of erbium-doped glass of different compositions.

The present invention provides a structure for exploiting almost the full 25 THz of bandwidth available in the low-loss window of optical fibers from 1430 nm to 1620 nm. The broadband NLPA amplifier of the invention combines Raman amplification with either PA or 4 WM to achieve bandwidth performance improvements that neither technology by itself has heretofore been able to deliver.

More specifically, the broadband NLPA of the invention comprises an input port for inputting an optical signal having a wavelength $\lambda$, a distributed gain medium for receiving the optical signal and amplifying and spectrally broadening the same therein through nonlinear polarization, a pumping means operated at wavelength $\lambda_p$ for generating a pumping light to pump the distributed gain medium, and an output port for outputting the amplified and spectrally broadened optical signal. The distributed gain medium has zero-dispersion at wavelength $\lambda_0$ such that $\lambda \geq \lambda_0 \geq \lambda_p$. The pumping light cascades through the distributed gain medium a plurality of Raman orders including an intermediate order having a wavelength $\lambda_r$ at a close proximity to the zero-dispersion wavelength $\lambda_0$ to phase match four-wave mixing (if $\lambda_r < \lambda_0$) or parametric amplification (if $\lambda_r > \lambda_0$).

A first embodiment of the NLPA uses open-loop amplification with an optical fiber gain medium. A pump source operated at 1240 nm is used. The pump may be retro-reflected to increase the conversion efficiency. A second embodiment of the NLPA uses a Sagnac Raman cavity that is pumped at 1240 nm. Feedback in the Sagnac Raman cavity reduces the required pump power, and the broadband cavity design supports much of the generated bandwidth. A third embodiment of the NLPA uses a Sagnac Raman cavity pumped at 1117 nm for a very broadband operation.

The present invention also relates to a parallel optical amplification apparatus having a combination of optical amplifiers. In one embodiment, the parallel optical amplification apparatus comprises two parallel stages of NLPAs with one NLPA optimized for 1430 to 1480 nm and the other for 1480 to 1530 nm. In another embodiment, the full 25 THz of the low-loss window in optical fibers is exploited by using a parallel combination of a Raman amplifier and a rare earth doped amplifier. Preferably, an NLPA of the invention is used cover the low-loss window of approximately 1430 nm to 1530 nm, and an EDFA is used to cover the low-loss window of approximately 1530 nm to 1620 nm.

To provide a better understanding of the amplification mechanisms at work in the present invention, we first describe stimulated Raman scattering, Raman cascading, PA and 4 WM. Stimulated Raman scattering effect, PA and 4 WM are the result of third-order nonlinearities that occur when a dielectric material such as an optical fiber is exposed to intense light. The third-order nonlinear effect is proportional to the instantaneous light intensity.

1. Stimulated Raman Scattering

Figure 4:
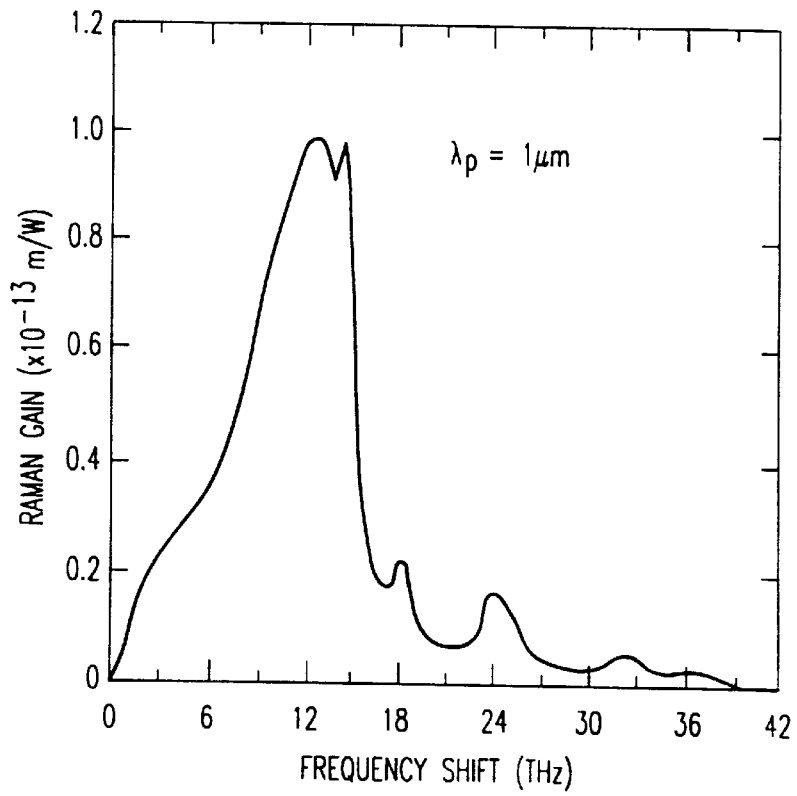
FIG. 4 depicts a measured Raman-gain spectrum for fused silica at a pump wavelength of 1000 nm.

Stimulated Raman scattering is an important nonlinear process that turns optical fibers into amplifiers and tunable lasers. Raman gain results from the interaction of intense light with optical phonons in silica fibers, and Raman effect leads to a transfer of energy from one optical beam (the pump) to another optical beam (the signal). The signal is downshifted in frequency (or upshifted in wavelength) by an amount determined by vibrational modes of silica fibers. The Raman gain coefficient $g_r$ for the silica fibers is shown in FIG. 4. Notably, the Raman gain $g_r$ extends over a large frequency range (up to 40 THz) with a broad peak centered at 13.2 THz (corresponding to a wavelength of 440 $cm_{31\ 1}$). This behavior over the large frequency range is due to the amorphous nature of the silica glass and enables the Raman effect to be used in broadband amplifiers. The Raman gain also depends on the composition of the fiber core and can vary with different dopant concentrations.

Raman amplification has some attractive features. First, Raman gain is a good candidate for upgrading existing fiber optic links because it is based on the interaction of pump light with optical phonons in the existing fibers. Second, there is no excessive loss in the absence of pump power—an important consideration for system reliability.

2. Raman Cascading

Cascading is the mechanism by which optical energy at the pump wavelength is transferred, through a series of nonlinear polarizations, to an optical signal at a longer wavelength. Each nonlinear polarization of the dielectric produces a molecular vibrational state corresponding to a wavelength that is offset from the wavelength of the light that produced the stimulation. The nonlinear polarization effect is distributed throughout the dielectric, resulting in a cascading series of wavelength shifts as energy at one wavelength excites a vibrational mode that produces light at a longer wavelength. This process can cascade through numerous orders. Because the Raman gain profile has a peak centered at 13.2 THz in silica fibers, one Raman order can be arranged to be separated from the previous order by 13.2 THz.

Cascading makes stimulated Raman scattering amplifiers very desirable. Raman amplification itself can be used to amplify multiple wavelengths (as in wavelength division multiplexing) or short optical pulses because the gain spectrum is very broad (a bandwidth of greater than 5 THz around the peak at 13.2 THz). Moreover, cascading enables Raman amplification over a wide range of different wavelengths. By varying the pump wavelength or by using cascaded orders of Raman gain, the gain can be provided over the entire telecommunications window between 1300 nm and 1600 nm.

3. Parametric Amplification and Four-Wave Mixing

PA/4 WM involve two pump (P) photons that create Stokes (S) and anti-Stokes (A) photons. Both PA/4 WM and Raman amplification arise from the third order susceptibility $X^{(3)}$ in optical fibers. More specifically, the real part of $x_{(3)}$, the so-called nonlinear index of refraction $n_2$, is responsible for PA/4 WM, while the imaginary part of $X^{(3)}$ associated with molecular vibrations corresponds to the Raman gain effect. In silica fibers, about ⅘ths of the $n_2$ is an electronic, instantaneous nonlinearity caused by ultraviolet resonances, while about ⅕th of $n_2$ arises from Raman-active vibrations, e.g., optical phonons (see further description in M. N. Islam, Ultrafast Fiber Switching Devices and Systems, Cambridge University Press, 1992). The imaginary part of this latter contribution corresponds to the Raman gain spectrum of FIG. 4.

Whereas Raman amplification is attractive for providing optical gain, PA/4 WM offers an efficient method to broaden the bandwidth of the optical gain. PA/4 WM has a much smaller frequency separation between pump and signal than Raman amplification, and the frequency difference may depend on the pump intensity. Just as in Raman amplification, the main advantage of PA/4 WM gain is that it is present in every fiber. However, unlike the Raman effect, both PA and 4 WM require phase-matching. 4 WM is usually inefficient in long fibers due to the requirement for phase-matching. However, PA can act as self-phase-matched because the nonlinear index of refraction is used to phase match the pump and sidebands. This is particularly true when operating near the zero-dispersion wavelength in fibers. When 4 WM and PA occur near the zero-dispersion wavelength of a single-mode fiber, phase-matching becomes automatic in the fiber. In 4 WM, sidebands are generated without gain when the pump wavelength falls in the normal dispersion regime (where the pumping wavelength is shorter than the zero-dispersion wavelength). PA is 4-photon amplification in which the nonlinear index of refraction is used to phase match the pump and sidebands. For PA the pump wavelength must lie in the anomalous group velocity regime (i.e., where the pumping wavelength is longer than the zero-dispersion wavelength) and proper phase matching requires that pump and signal be co-propagating.

To illustrate the PA/4 WM gain, consider the gain coefficient as derived in R. H. Stolen and J. E. Bjorkholm, IEEE J. Quantum Elect., QE-18, 1062 (1982):

$$g = \sqrt{(\gamma P)^2 - \left[\left(\frac{\Delta \kappa}{2}\right) + \gamma P\right]^2} \quad (1)$$

The first term under the square root sign corresponds to the third order nonlinearity that couples the pump photons to the sidebands. The second term corresponds to the phase mismatch between the waves and it consists of two parts: one due to the wave-vector mismatch at the different wavelengths and the other due to the increase in nonlinear index induced by the pump. The nonlinearity parameter is defined as $$\gamma = \frac{\omega}{c} \frac{n_2}{A_{eff}} = \frac{2\pi}{\lambda} \frac{n_2}{A_{eff}} \quad (2)$$

Also, assuming that we are operating near the zero-dispersion wavelength $\lambda_o$, the propagation constant can be expanded as $$\Delta \kappa = -\frac{\lambda^2}{2\pi c} \left[\frac{dD}{d\lambda}\right]_{\lambda_o} (\lambda_p - \lambda_o) \Omega^2 \quad (3)$$

where $$\Omega = \omega_p - \omega_s = \omega_a - \omega_p. \quad (4)$$

Figure 5:
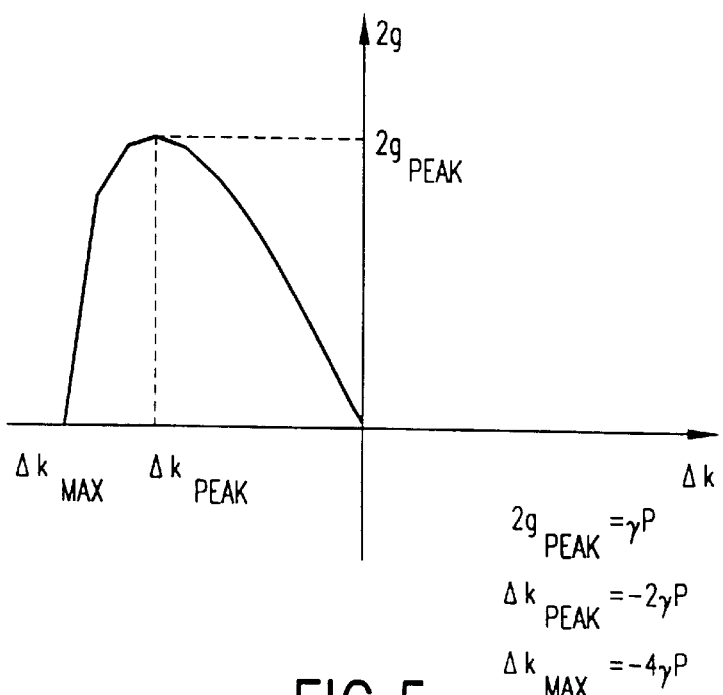
FIG. 5 plots power gain coefficient 2 g versus phase vector mismatch Δk for parametric amplification.

When the pump wavelength falls in the normal dispersion regime, then D<0, $\partial D/\partial \lambda$>0, $(\lambda_p - \lambda_o)$<0, so that $\Delta k$>0. In this case, g is always imaginary, and there is no gain during the sideband generation process. This corresponds to the case of 4 WM. If operation is in the anomalous group velocity dispersion regime, then D>0, $\partial D/\partial \lambda$>0, $(\lambda_p - \lambda_o)$>0, so that $\Delta k$<0. This is the regime of PA, and the nonlinearity helps to reduce the phase mismatch (i.e., the two parts in the second term in Equation (1) are of opposite sign). There is gain for PA, and the gain is tunable with the pump power. As an example, the power gain coefficient 2 g is plotted schematically in FIG. 5 for operation in the anomalous group velocity regime. The peak gain ($g_{peak} = \gamma P$) occurs at $\Delta k_{peak} = -2\gamma P$. The range over which the gain exists is given by 0>$\Delta k$>-4$\gamma P$. Thus, the peak gain is proportional to the pump power, and the $\Delta k$ range is determined by the pump power. Consequently, from Equation (2) we see that the bandwidth can be increased by increasing the pump power, increasing the nonlinear coefficient $n_2$ or decreasing the effective area $A_{eff}$. Alternately, for a given required frequency range over which gain is required, the pump requirements can be reduced by increasing the effective nonlinearity ($n_2/A_{eff}$).

4. Broadband NLPA by Combining Raman and Either PA or 4 WM

This invention leads to broadband gain for cascaded Raman amplification by arranging at least one intermediate Raman cascade order at a close proximity to the zero-dispersion wavelength $\lambda_0$ (e.g., within ±5 nm of $\lambda_0$, optimally within ±2 nm ). Either 4 WM (if $\lambda_r<\lambda_0$) or PA (if $\lambda_r>\lambda_0$) will lead to spectral broadening of that particular Raman order. Then, in subsequent Raman orders the bandwidth will grow even further. It is further advantageous if the cascade Raman wavelength $\lambda_r$ lies to the long wavelength side of $\lambda_0$ (i.e., in the anomalous dispersion regime), so that parametric amplification can occur.

Figure 6:
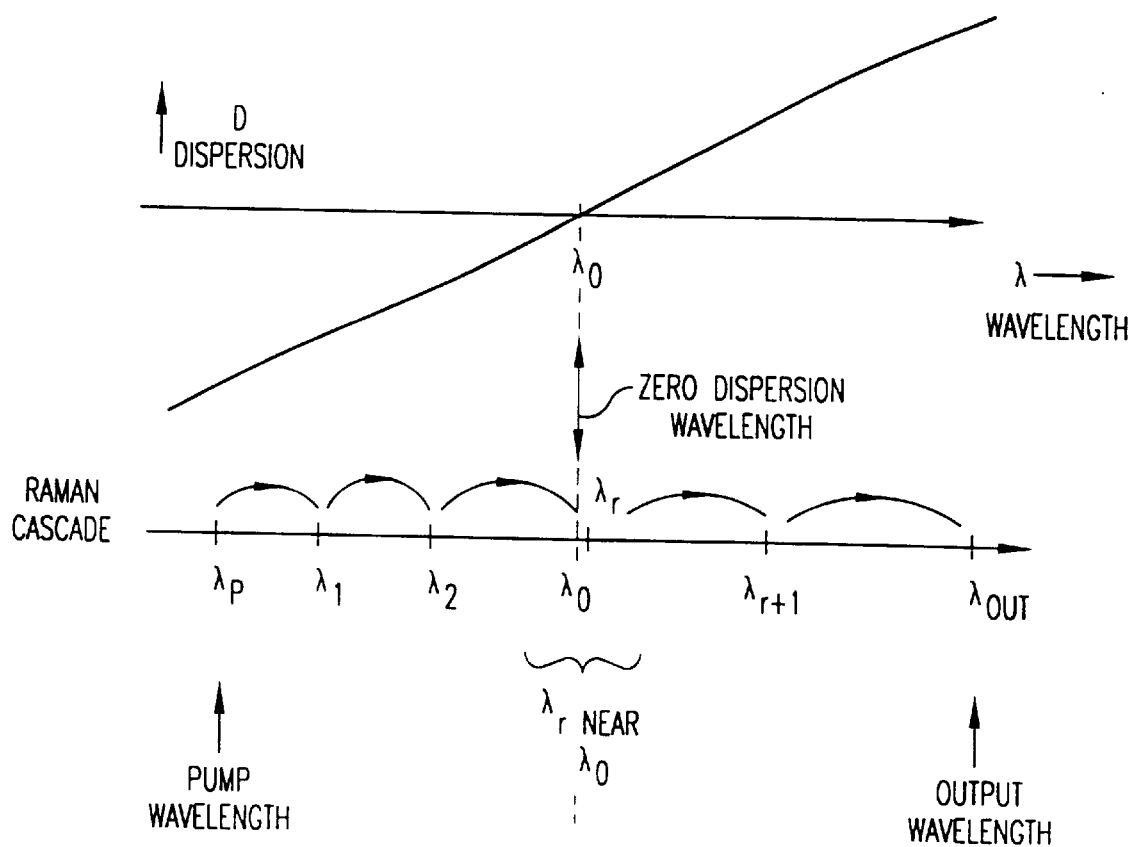
FIG. 6 demonstrates basic concepts of the NLPA of the invention.

The basic concept of the broadband NLPA is illustrated in FIG. 6. Starting from the pump wavelength $\lambda_p$, cascaded Raman amplification can be used in the first few stages. This is only if the pump is more than one Raman shift or 13.2 THz away from the zero-dispersion wavelength. (If it is desired to keep higher efficiency in these initial steps, a narrow band cavity design can be used, such as designs based on gratings or wavelength selective couplers.)

The key to the invention of broadening the gain bandwidth is that one of the intermediate Raman cascade orders lies at a close proximity to the zero-dispersion wavelength $\lambda_0$. By operating close to $\lambda_0$, it almost automatically phase-matches either 4 WM or PA. In the subsequent cascaded Raman orders, the gain bandwidth may continue to broaden. This occurs because the effective gain bandwidth of Raman is the convolution of the bandwidth of the pump (in this case, the previous Raman cascade order) with the Raman gain curve. In this regard, see discussion in R. H. Stolen, et al., "Development of the stimulated Raman spectrum in single-mode silica fibers," Journal of the Optical Society of America B, Vol. 1 (1984), pp. 652–57. Thus, the basic idea is to take advantage of the property of Raman amplification that the gain spectrum follows the pump spectrum. As the pump wavelength changes, the Raman gain changes as well, separated by the distance of optical phonons energy which in silica fibers is an approximately 13.2 THz down-shift in frequency.

If the fiber is conventional so-called standard fiber, then zero-dispersion wavelength $\lambda_0$ is about 1310 nm. On the other hand, for dispersion-shifted fiber the zero-dispersion wavelength $\lambda_0$ can shift to longer wavelengths by adding waveguide dispersion. Alternately, a dispersion-flattened fiber could be used for low dispersion values over one or more of the Raman cascade orders. The additional advantage of using dispersion-flattened fiber is that the dispersion slope is small, so the gain bandwidth will be even larger (cf. Equations (1) and (3)).

The Raman gain spectrum can follow the pump spectrum only so long as there is nothing in the Raman cavity to restrict the bandwidth of the subsequent orders. Therefore, for these higher cascade orders Raman laser schemes, it is not desirable to use either gratings or wavelength selective couplers. On the other hand, the broadband cavity design of the Sagnac Raman amplifier and laser lends itself naturally to increased bandwidth by tailoring the pump spectrum. A single-pass fiber design constitutes the broadest bandwidth design. However, a broadband cavity such as the Sagnac Raman cavity is advantageous because the feedback is used to lower the threshold and the required pump power. Also, it should be noted that broadening the bandwidth leads to a drop in efficiency, so the pump powers are already higher for the broadband cavity designs.

5. Example of NLPA Gain Broadening from PA and Cascaded Raman

To illustrate the cascaded Raman amplification to reach the 1430–1530 nm range of the low-loss window, consider pumping with a commercially available cladding-pumped fiber laser, which operates around 1060 to 1140 nm. The various Raman orders, each separated by 13.2 THz from the previous order, are set forth in Table 1.

TABLE 1

Various Raman orders when pumping between 1060 and 1140 nm (separation of 13.2THZ between orders)

| Wavelength (nm) | Δλ | Wavelength (nm) | Δλ |
| --- | --- | --- | --- |
| 1060.00 | 51.86 | 1110.00 | 57.00 |
| 1111.86 | 57.19 | 1167.00 | 63.17 |
| 1169.05 | 63.39 | 1230.16 | 70.40 |
| 1232.44 | 70.66 | 1300.56 | 78.94 |
| 1303.11 | 79.26 | 1379.50 | 89.14 |
| 1382.37 | 89.53 | 1468.64 | 101.46 |
| 1471.90 | 101.93 | 1570.10 | 116.52 |
| 1573.82 | 117.09 | 1686.62 | 135.20 |
| 1070.00 | 52.86 | 1117.00 | 57.74 |
| 1122.86 | 58.36 | 1174.74 | 64.03 |
| 1181.22 | 64.76 | 1238.77 | 71.41 |
| 1245.98 | 72.27 | 1310.18 | 80.15 |
| 1318.25 | 81.17 | 1390.33 | 90.59 |
| 1399.42 | 91.82 | 1480.92 | 103.22 |
| 1491.25 | 104.72 | 1584.15 | 118.69 |
| 1595.97 | 120.54 | 1702.84 | 137.92 |
| 1080.00 | 53.88 | 1120.00 | 58.05 |
| 1133.88 | 59.54 | 1178.05 | 64.40 |
| 1193.42 | 66.14 | 1242.46 | 71.85 |
| 1259.56 | 73.90 | 1314.31 | 80.67 |
| 1333.47 | 83.11 | 1394.98 | 91.22 |
| 1416.58 | 94.16 | 1486.20 | 103.99 |
| 1510.74 | 107.57 | 1590.19 | 119.63 |
| 1618.32 | 124.07 | 1709.82 | 139.10 |
| 1090.00 | 54.91 | 1130.00 | 59.12 |
| 1144.91 | 60.74 | 1189.12 | 65.65 |
| 1205.65 | 67.54 | 1254.77 | 73.32 |
| 1273.19 | 75.56 | 1328.10 | 82.43 |
| 1348.74 | 85.09 | 1410.53 | 93.33 |
| 1433.83 | 96.55 | 1503.86 | 106.56 |
| 1530.38 | 110.49 | 1610.42 | 122.81 |
| 1640.87 | 127.69 | 1733.24 | 143.09 |
| 1100.00 | 55.95 | 1140.00 | 60.20 |
| 1155.95 | 61.94 | 1200.20 | 66.92 |
| 1217.89 | 68.96 | 1267.12 | 74.82 |
| 1286.85 | 77.24 | 1341.93 | 84.21 |
| 1364.09 | 87.10 | 1426.14 | 95.48 |
| 1451.19 | 98.98 | 1521.62 | 109.18 |
| 1550.17 | 113.47 | 1630.81 | 126.07 |
| 1663.64 | 131.40 | 1756.87 | 147.19 |

To obtain gain between 1430 nm and 1520 nm, the pump is operated between 1090 nm and 1140 nm, and five cascaded Raman orders are used to reach the desired wavelength. To make use of the broadening from PA or 4 WM, a pumping scheme is selected in the middle of this range, i.e., starting with a pump wavelength of 1117 nm. Then, the various Raman orders land at approximately 1175 nm, 1240 nm, 1310 nm, 1390 nm and finally 1480 nm. In particular, the third Raman frequency (1310 nm) passes through the zero-dispersion point of a standard fiber, and the next order (1390 nm) could be close if the fiber is dispersion shifted. Therefore, a broadband gain is expected for wavelengths in the 1430–1530 nm range centered around 1480 nm by using a fiber with a standard dispersion and a pump wavelength of 1117 nm, 1175 nm or 1240 nm.

Figure 7:
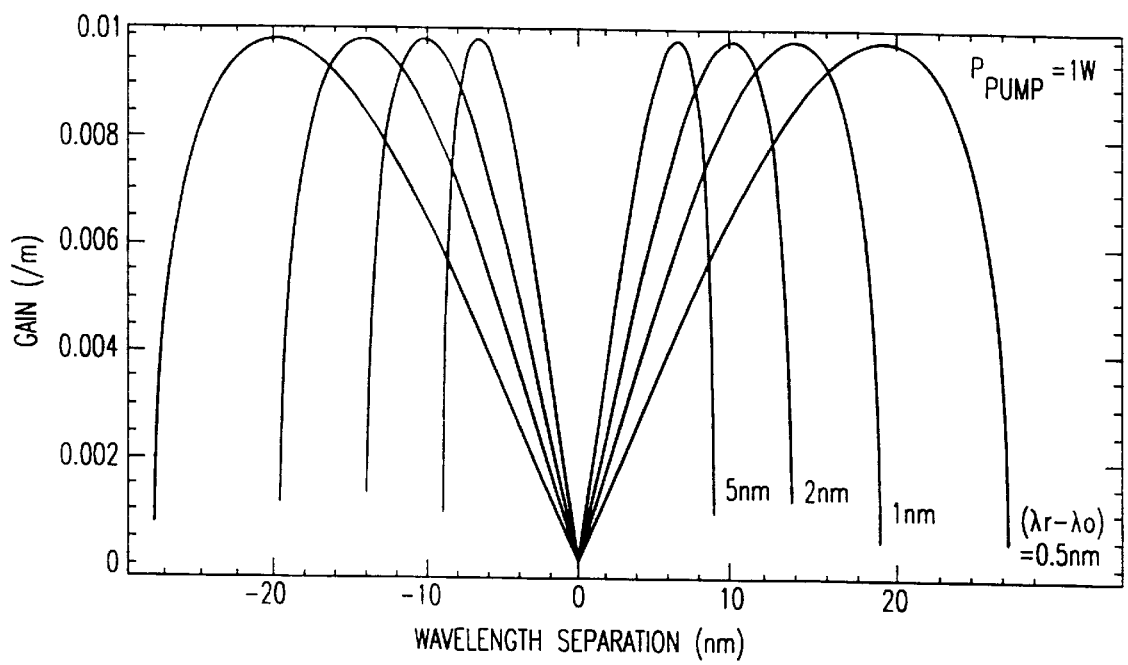
FIG. 7 illustrates the spectral broadening and gain expected from PA for a pump power of 1 W and different separations between the pump and zero-dispersion wavelength.
Figure 8:
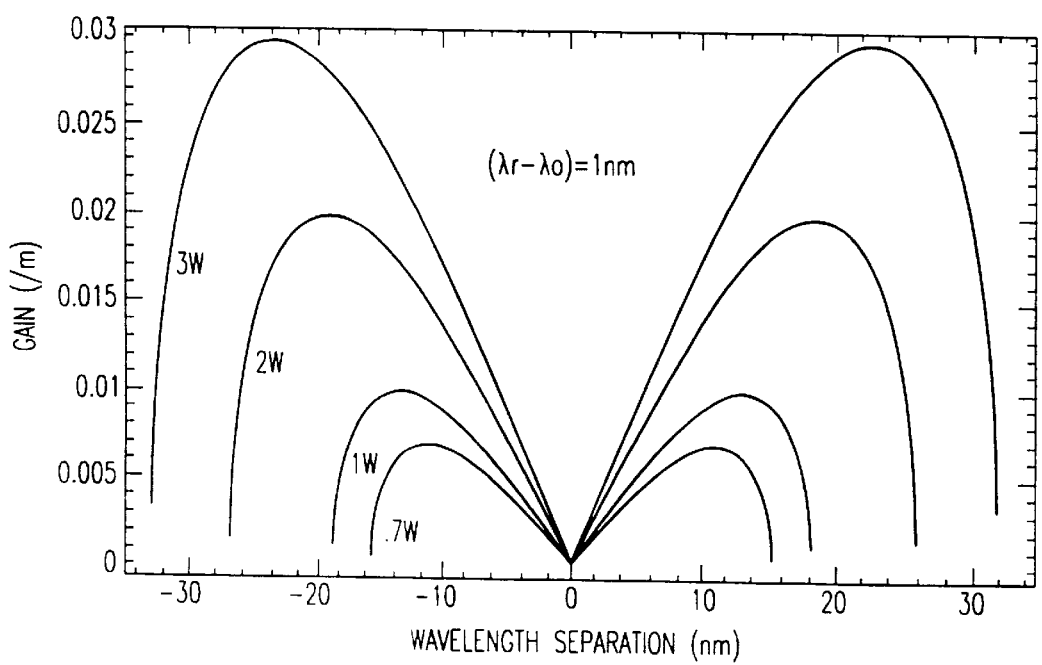
FIG. 8 illustrates the spectral broadening and gain expected from PA for a pump and zero-dispersion wavelength separation of 1 nm and for varying pump powers.

Next, consider the broadening expected from PA. Assume that a standard fiber is used and the pump wavelength starts at 1117 nm. The calculations use Equations (1–4) with the following typical parameters for high-Raman cross-section fiber: $\lambda_0$=1310 nm, $\gamma$=9.9 W$^{-1}$km$^{-1}$, and a dispersion slope of 0.05 ps/nm-km. In FIG. 7, the gain coefficient for PA is plotted versus wavelength at a pump power of 1 W and wavelength separations ($\lambda_r-\lambda_0$) of 0.5, 1, 2 and 5 nm. For a wavelength separation of 2 nm, the PA peak gain occurs at ±10 nm, so the spectral broadening is over 20 nm. The closer the pump wavelength approaches the zero-dispersion wavelength, the wider the gain bandwidth. In addition, FIG. 8 plots the gain versus wavelength for a separation of $(\lambda_r-\lambda_0)=1$ nm and pump powers of 0.7, 1, 2, and 3 W. The peak gain increases directly proportional to the pump power, while the bandwidth increases as the square root of pump power.

6. Preferred Embodiments of NLPA Amplifiers

Figure 9:
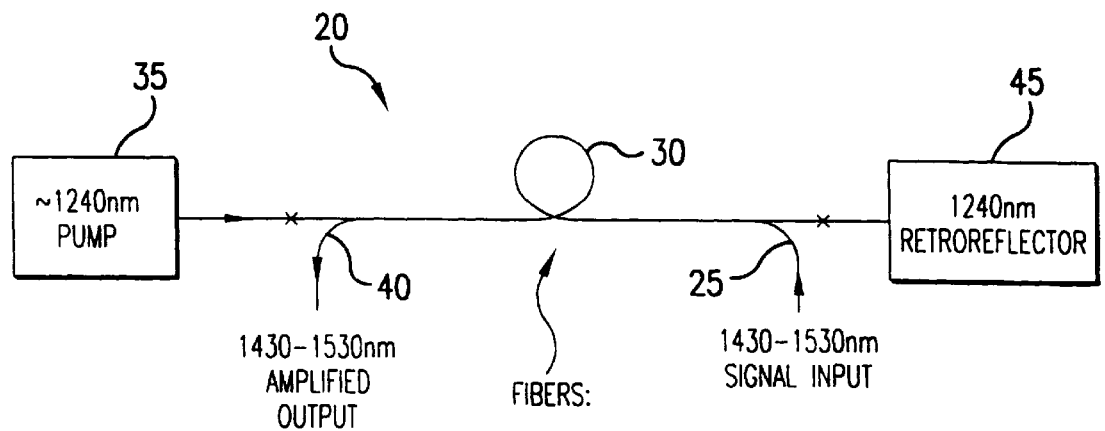
FIGS. 9, 9a, 9b and 9c are schematic illustrations of a first embodiment of an NLPA using an open-loop configuration.

FIG. 9 shows a first embodiment of the invention which uses an open-loop design to produce an amplified broadband signal for a range of wavelengths between 1430 nm and 1530 nm. The open-loop design is the simplest nonlinear polarization amplifier although it may have a high pump power requirement. In the NLPA amplifier 20 as illustrated in FIG. 9, an optical signal having a wavelength between 1430 nm and 1530 nm is input from an input port 25 to an optical fiber 30. The optical fiber 30 is pumped by a pumping light generated by a pumping laser 35 operated at a wavelength of about 1240 nm. The optical signal is amplified and spectrally broadened in the fiber by nonlinear polarization, and output through an output port 40. The configuration is so arranged that the optical signal has a wavelength greater than the zero-dispersion wavelength of the fiber, which in turn is greater than the pumping wavelength of 1240 nm.

Figure 9A:
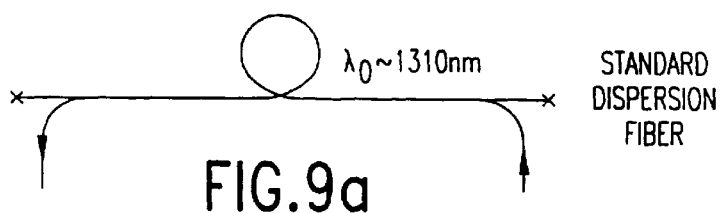
Figure 9B:
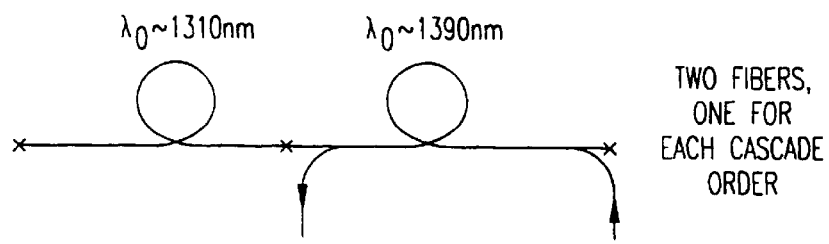
Figure 9C:
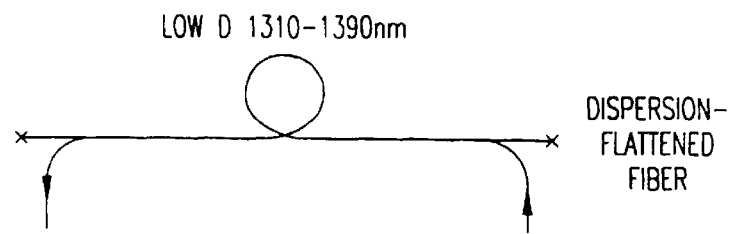

In this open-loop configuration, the fiber must have a cut-off wavelength below 1240 nm to be single-mode (spatial) over all wavelengths of the Raman cascade. Three choices of the fiber are preferred in this configuration. First, FIG. 9a, a standard dispersion fiber with a zero-dispersion wavelength at about 1310 nm. Second, FIG. 9b, two fibers spliced together with one fiber having a zero-dispersion wavelength at about 1310 nm (first cascade) and the other at 1390 nm (second cascade). Third, FIG. 9c, a dispersion-flattened fiber with low-dispersion at least between 1310 nm and 1390 nm. The reduced dispersion slope of such a dispersion-flattened fiber increases significantly the bandwidth for PA or 4 WM.

Exemplary 1240 nm pump lasers include: (a) an 1117 nm cladding-pumped fiber laser followed by a coupler-based or grating-based Raman oscillator cavity (with gratings for 1117 nm, 1175 nm and 1240 nm); (b) an optically-pumped semiconductor laser; or (c) a chromium-doped forestries laser. At one end of the fiber, a 1240 nm retro-reflector 45 is preferably placed to increase pumping conversion efficiency. The retro-reflector is preferably a dichroic mirror or a 1240 nm grating. The input and output ports are preferably WDM couplers, and isolators should be used at the input and output ports to prevent from lapsing due to spurious feedback. It is desirous to use a counter-propagating geometry to average out noise fluctuations in this open-loop configuration. It is also possible to use a co-propagating geometry.

Figure 10:
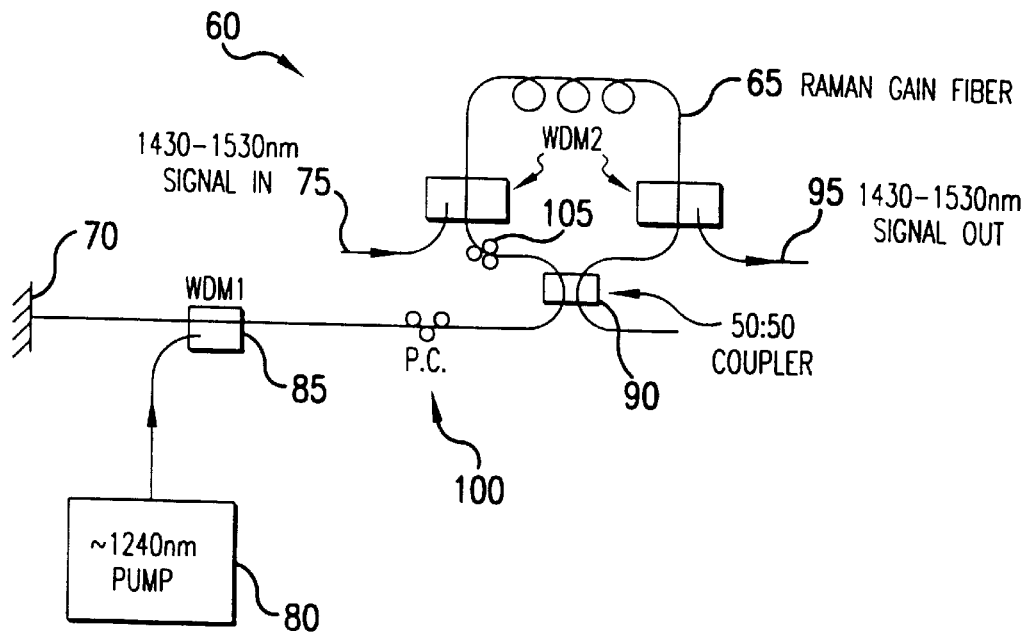
FIG. 10 is a schematic illustration of a second embodiment of an NLPA using a Sagnac Raman cavity that is pumped at 1240 nm.

To reduce the pump power requirements, a broadband cavity such as the Sagnac Raman cavity is used. FIG. 10 illustrates an embodiment of the NLPA that uses a Sagnac Raman cavity design with a 1240 nm pump. Referring to FIG. 10, the Sagnac Raman cavity of the NLPA 60 is formed by a broadband mirror 70 and a loop mirror comprising a Raman gain fiber 65 and an optical coupler 90 connected thereto. The Sagnac Raman cavity design is described in a U.S. Patent application Ser. No. 08/773,482, and this patent application is incorporated herein by reference. An optical signal having a wavelength between 1430 nm to 1530 nm is input through an input port 75 to the Raman gain fiber 65. A pumping laser 80 operated at a wavelength 1240 nm generates a pumping light that pumps the fiber 65 through a coupling means 85. The optical signal is amplified and spectrally broadened in the fiber by nonlinear polarization, and output through an output port 95. The configuration is so arranged that the optical signal has a wavelength greater than the zero-dispersion wavelength of the fiber, which in turn is greater than the pumping wavelength of 1240 nm.

The Raman gain fiber has the same characteristics as described above for the open-loop design. Similarly, the pumping lasers used in the first embodiment are used in this second embodiment. The broadband NLPA may further include a polarization controller 100 in the Sagnac Raman cavity for controlling polarization state. However, if the fiber is polarization maintained, the polarization controller is not necessary. The optical coupler 90 is nominally 50:50 at least for the optical signal having a wavelength between about 1240 nm and 1430 nm. The coupling means 85 is a WDM coupler which transmits at least at a wavelength between about 1300 nm and 1430 nm. Moreover, the input port and output port each comprises a WDM coupler which transmits at least at a wavelength between about 1240 nm and 1425 nm. A key advantage of the Sagnac Raman cavity is that it has a passive noise dampening property that leads to quieter cascading of various Raman orders.

Figure 11:
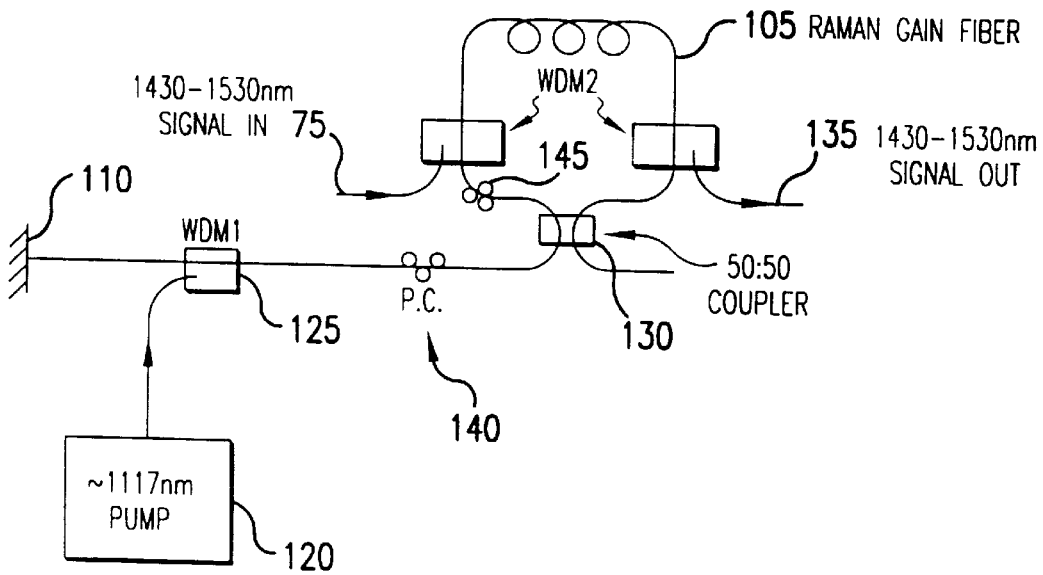
FIG. 11 is a schematic illustration of a third embodiment of an NLPA using a Sagnac Raman cavity that is pumped at 1117 nm.

As an alternative, the same kind of Sagnac Raman cavity can be used for all five Raman cascade orders between 1117 nm and the low-loss window. FIG. 11 illustrates a third embodiment of a five-order Sagnac Raman amplifier for NLPA operation. A cladding-pumped fiber laser operating around 1117 nm is used as a pumping laser 120. Different fiber combinations described in the first embodiment can be used except that the fibers must have a cut-off wavelength below 1117 nm to accommodate single-mode operation for the pump. An optical coupler 130 is nominally 50:50 at least for the optical signal having the wavelength between about 1117 nm and 1430 nm. A coupling means 125 is a WDM coupler which transmits at least at wavelengths between about 1165 nm and 1430 nm. Moreover, the input and output ports each comprises a WDM coupler which transmits at least at wavelengths between about 1117 nm and 1425 nm. Although the wavelength range of the various components increases, this configuration leads to an even broader gain band since the pump bandwidth is allowed to increase even during the first two cascades between 1117 nm and 1240 nm. Also, the noise dampening property of the Sagnac cavity can be used advantageously over all five Raman orders.

In general, the NLPA is operated as follows. An optical signal having a wavelength $\lambda$ is input through an input port into a distributed gain medium having zero-dispersion at a wavelength $\lambda_0$, such as an optical fiber, which is pumped by a pumping light from a pumping means operated at a wavelength $\lambda_p$, wherein $\lambda \geq \lambda_0 \geq \lambda_p$. The pumping light cascades through the distributed gain medium a plurality of Raman orders including an intermediate order having a wavelength $\lambda_r$ at a close proximity to the zero-dispersion wavelength $\lambda_0$ to phase match four-wave mixing (if $\lambda_r<\lambda_0$) or parametric amplification (if $\lambda_r>\lambda_0$). The amplified and spectrally broadened optical signal is output through an output port.

7. Broadband Parallel Optical Amplification Apparatus

The above embodiments demonstrate that a single NLPA can accommodate the full bandwidth of the low-loss window. Moreover, the full bandwidth of the low-loss window may be reached by using a parallel optical amplification apparatus having a combination of two or more Raman amplifiers and rare earth doped amplifiers. Preferably, the NLPAs and EDFAs are used.

Figure 12:
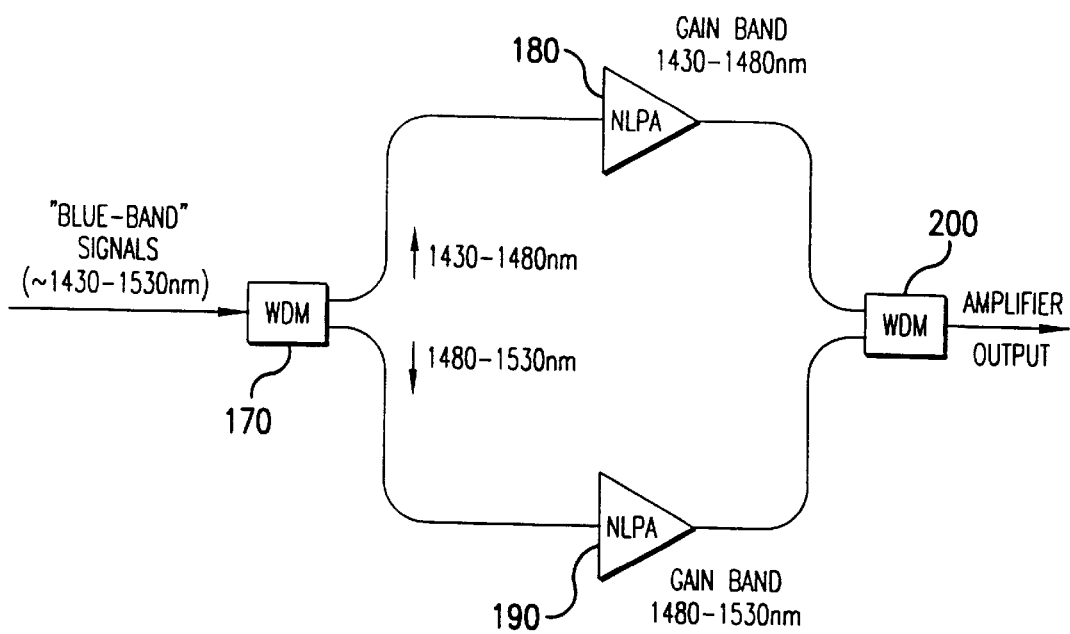
FIG. 12 is a schematic illustration of a first embodiment of a parallel optical amplification apparatus having two stages of NLPAs.

FIG. 12 shows a first embodiment of the parallel optical amplification apparatus using a combination of two NLPAs for a range of wavelengths between 1430 nm and 1530 nm.

Referring to FIG. 12, a dividing means 170 divides an optical signal having a wavelength between 1430 nm to 1530 nm at a predetermined wavelength, preferably at 1480 nm, into a first beam having a wavelength less than the predetermined wavelength and a second beam having a wavelength greater than the predetermined wavelength. The first beam is input into a first NLPA 180 for amplification and spectral broadening therein. The second beam is input into a second NLPA 190 for amplification and spectral broadening therein. Outputs from the first and second NLPAs are combined by a combining means 200 to produce an amplified and spectrally broadened optical signal. The input port 170 and output port 200 are preferably WDM couplers.

It is preferred that the first NLPA 180 is optimized for 1430–1480 nm and centered at 1455 nm, while the second NLPA is optimized for 1480–1530 nm and centered at 1505 nm. From Table 1, these two windows can be achieved in a five-order cascade by starting with a pump wavelength of about 1100 nm for the short-wavelength side and a pump wavelength of about 1130 nm for the long-wavelength side. For the short-wavelength side, the fiber should have a zero-dispersion around 1365 nm, while for the long-wavelength side, the fiber zero-dispersion should be around 1328 nm or 1410 nm.

The narrower-bandwidth for each NLPA will also lead to an increased efficiency for each amplifier. Furthermore, the components may be more easily manufactured, since the wavelength window is not as large. Finally, the multiple amplifiers may allow for gradual upgrades of systems, adding bandwidth to the EDFA window as needed.

Figure 13:
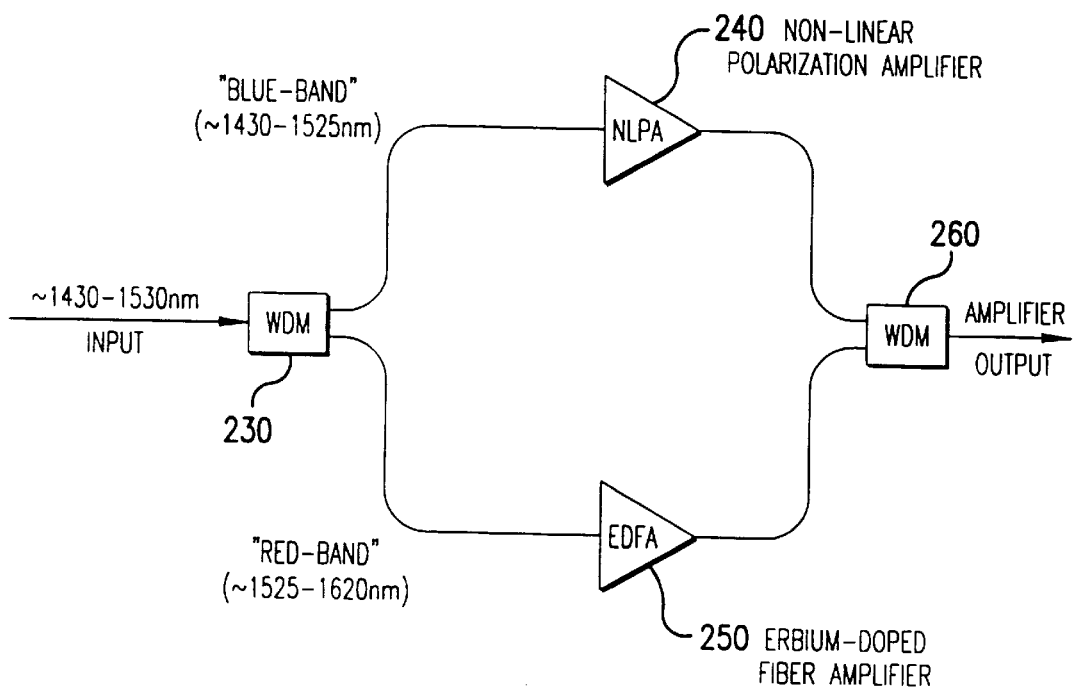
FIG. 13 is a schematic illustration of a second embodiment of a parallel optical amplification apparatus that is a combination of an EDFA and an NLPA.

A spectrum of 1430–1620 nm in the low-loss window is amplified and spectrally broadened by using a parallel optical amplification apparatus comprising Raman amplifiers and rare earth doped amplifiers. FIG. 13 describes a second embodiment of the parallel optical amplification apparatus. The amplification apparatus comprises a broadband NLPA 240 as disclosed in this invention and a EDFA 250. A dividing means 230 of the apparatus divides an optical signal having a wavelength between 1430 nm and 1620 nm at a predetermined wavelength, preferably at 1525 nm, into a first beam having a wavelength less than the predetermined wavelength and a second beam having a wavelength greater than the predetermined wavelength. The broadband NLPA 240 receives the first beam and produces an amplified broadband first beam. The EDFA 250 receives the second beam and produces an amplified broadband second beam. A combining means 260 combines the amplified and spectrally broadened first and second beams to produce an amplified broadband optical signal. It is preferred that both the dividing means 230 and the combining means 260 are WDM couplers.

To use any of these embodiments with multi-wavelength WDM channels, it will most likely be necessary to include at the output of the amplifier some means for equalizing the gain. This wavelength dependency or nonuniformity of the gain band has little impact on single-channel transmission. However, it renders the amplifier unsuitable for multichannel operation through a cascade of amplifiers. As channels at different wavelengths propagate through a chain of amplifiers, they accumulate increasing discrepancies between them in terms of gain and signal-to-noise ratio. Using gain-flattening elements can significantly increase the usable bandwidth of a long chain of amplifiers. For example, the NLPA can be followed by a gain flattening element to provide gain equalization for different channels. Alternately, the gain flattening element could be introduced directly into the Sagnac interferometer loop of FIG. 10 or 11.

It is understood that various other modifications will be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

What is claimed is:

1. A broadband parallel optical amplification apparatus, said apparatus comprising:

a dividing means for dividing an optical signal having a wavelength between 1430 nm to 1530 nm at a predetermined wavelength $\lambda_d$ into a first beam having a wavelength $\lambda_1$ less than $\lambda_d$ and a second beam having a wavelength $\lambda_2$ greater than $\lambda_d$;

a first broadband nonlinear polarization amplifier comprising a first input port for inputting said first beam;

a first distributed gain medium for receiving said first beam and amplifying and spectrally broadening said first beam therein through nonlinear polarization, said first distributed gain medium having zero-dispersion at wavelength $\lambda_{o1}$;

a first pumping means operated at wavelength $\lambda_{p1}$ for generating a first pumping light to pump said first distributed gain medium; and a first output port for outputting said amplified and spectrally broadened first beam, wherein $\lambda_1 \geq \lambda_{o1} \geq \lambda_{p1}$, and said first pumping light cascades through said first distributed gain medium a plurality of Raman orders including an intermediate order having a wavelength $\lambda_{r1}$ at a close proximity to said zero-dispersion wavelength $\lambda_{o1}$ to phase match four-wave mixing (if $\lambda_{r1}<\lambda_{o1}$) or parametric amplification (if $\lambda_{r1}>\lambda_{o1}$);

a second broadband nonlinear polarization amplifier comprising a second input port for inputting said second beam;

a second distributed gain medium for receiving said second beam and amplifying and spectrally broadening said second beam therein through nonlinear polarization, said second distributed gain medium having zero-dispersion at wavelength $\lambda_{o2}$;

a second pumping means operated at wavelength $\lambda_{p2}$ for generating a second pumping light to pump said second distributed gain medium; and a second output port for outputting said amplified and spectrally broadened second beam, wherein $\lambda_2 \geq \lambda_{o2} \geq \lambda_{p2}$, and said second pumping light cascades through said second distributed gain medium a plurality of Raman orders including an intermediate order having a wavelength $\lambda_{r2}$ at a close proximity to said zero-dispersion wavelength $\lambda_{o2}$ to phase match four-wave mixing (if $\lambda_{r2}<\lambda_{o2}$) or parametric amplification (if $\lambda_{r2}>\lambda_{o2}$); and means for combining said amplified and spectrally broadened first and second beams to produce an amplified broadband optical signal.

2. The optical signal amplification apparatus according to claim 1, wherein said predetermined wavelength $\lambda_d$ is about 1480 nm.

3. The optical signal amplification apparatus according to claim 1, wherein said second gain medium has said zero-dispersion wavelength $\lambda_{o2}$ of about 1328 nm.

4. The optical signal amplification apparatus according to claim 1, wherein said pumping wavelength $\lambda_{p1}$ is about 1100 nm.

5. The optical signal amplification apparatus according to claim 1, wherein said pumping wavelength $\lambda_{p2}$ is about 1130 nm.

6. The optical signal amplification apparatus according to claim 1, wherein said dividing means comprises a WDM coupler.

7. The optical signal amplification apparatus according to claim 1, wherein said combining means comprises a WDM coupler.

8. The optical signal amplification apparatus according to claim 1, wherein said first beam wavelength $\lambda_1$ is about 1455 nm.

9. The optical signal amplification apparatus according to claim 1, wherein said second beam wavelength $\lambda_2$ is about 1505 nm.

10. A parallel optical amplification apparatus, said apparatus comprising:
   a dividing means for dividing an optical signal having a wavelength between 1430 nm and 1620 nm at a predetermined wavelength $\lambda_d$ into a first beam having a wavelength $\lambda$ less than $\lambda_d$ and a second beam having a wavelength greater than $\lambda_d$;
   a broadband nonlinear polarization amplifier comprising predetermined wavelength $\lambda_d$ into a first beam having a wavelength $\lambda$ less than $\lambda_d$ and a second beam having a wavelength greater than $\lambda_d$;
   a broadband nonlinear polarization amplifier comprising
      an input port for inputting said first beam;
      a distributed gain medium for receiving said first beam and amplifying and spectrally broadening said first beam therein through nonlinear polarization, said distributed gain medium having zero-dispersion at wavelength $\lambda_0$;
      a pumping means operated at wavelength $\lambda_p$ for generating a pumping light to pump said distributed gain medium; and
      an output port for outputting said amplified and spectrally broadened first beam,
      wherein $\lambda \geq \lambda_0 \geq \lambda_p$, and
      said pumping light cascades through said distributed gain medium a plurality of Raman orders including an intermediate order having a wavelength $\lambda_r$ at a close proximity to said zero-dispersion wavelength $\lambda_0$ to phase match four-wave mixing (if $\lambda_r<\lambda_0$) or parametric amplification (if $\lambda_r>\lambda_0$);
   an erbium-doped fiber amplifier for receiving said second beam and producing an amplified broadband second beam; and
   means for combining said amplified and spectrally broadened first and second beams to produce an amplified broadband optical signal.

11. The optical signal amplifying apparatus according to claim 10, wherein said predetermined wavelength $\lambda_d$ is about 1525 nm.

12. The optical signal amplifying apparatus according to claim 11, wherein said dividing means comprises a WDM coupler.

13. The optical signal amplifying apparatus according to claim 11, wherein said combining means comprises a WDM coupler.

14. A method of producing an amplified broadband optical signal, said method comprising:
   inputting an optical signal having a wavelength $\lambda$ to a distributed gain medium having a zero-dispersion wavelength $\lambda_0$;
   generating a pumping light from a pumping means operated at a wavelength $\lambda_p$;
   pumping said distributed gain medium with said pumping light to amplify said optical signal;
   cascading said pumping light through said distributed gain medium a plurality of Raman orders, the wavelength $\lambda_p$ being such that an intermediate Raman order has a wavelength $\lambda_r$ at a close proximity to said zero-dispersion wavelength $\lambda_0$;
   phase matching said intermediate Raman order with four-wave mixing (if $\lambda_r<\lambda_0$) or parametric amplification (if $\lambda_r>\lambda_0$) for spectral broadening; and
   outputting said amplified and spectrally broadened optical signal, wherein $\lambda \geq \lambda_0 \geq \lambda_p$.

15. The method of producing an amplified broadband optical signal according to claim 14, wherein said wavelengths $\lambda_r$ and $\lambda_0$ satisfy the following relationship:

$$|\lambda_r - \lambda_0| \leq 5 \text{ nm}.$$

16. The method of producing an amplified broadband optical signal according to claim 15, wherein said distributed gain medium is an optical fiber.

17. The method of producing an amplified broadband optical signal according to claim 15, wherein said distributed gain medium is a standard dispersion fiber having a zero-dispersion wavelength $\lambda_0$ of about 1310 nm.

18. The method of producing an amplified broadband optical signal according to claim 15, wherein said distributed gain medium comprises first and second optical fibers spliced together, and said optical fibers are used for two different cascaded Raman orders and have a zero-dispersion wavelength $\lambda_0$ at about 1310 nm and 1390 nm respectively.

19. The method of producing an amplified broadband optical signal according to claim 15, wherein said distributed gain medium is a dispersion-flattened fiber with low dispersion at least between about 1310 nm and 1390 nm.

20. A method of producing an amplified broadband optical signal, said method comprising:
   inputting an optical signal having a wavelength $\lambda$ between about 1430 nm and 1530 nm to an optical fiber having zero-dispersion at wavelength $\lambda_0$ and a cut-off wavelength less than 1240 nm;
   generating a pumping light from a pumping means operated at a wavelength of 1240 nm;
   pumping said optical fiber with said pumping light for amplifying said optical signal;
   cascading said pumping light through said distributed gain medium a plurality of Raman orders, an intermediate Raman order having a wavelength $\lambda_r$ at a close proximity to said zero-dispersion wavelength $\lambda_0$;
   phase matching said intermediate Raman order with four-wave mixing (if $\lambda_r<\lambda_0$) or parametric amplification (if $\lambda_r>\lambda_0$) for spectral broadening; and
   outputting said amplified and spectrally broadened optical signal, wherein $\lambda \geq \lambda_0 \geq 1240$ nm.

21. The method of producing an amplified broadband optical signal according to claim 20, further comprising a step of increasing pumping conversion efficiency by retroreflecting a beam from the optical fiber.

22. The method of producing an amplified broadband optical signal according to claim 21, further comprising a step of using an isolator to prevent lapsing from spurious feedback.

23. A method of producing an amplified broadband optical signal, said method comprising:

providing a Sagnac Raman cavity comprising a broadband mirror, and a loop mirror comprising of a Raman gain fiber and an optical coupler connected thereto, said fiber having a zero-dispersion wavelength $\lambda_0$ and a cut-off wavelength $\lambda_{co}$;

inputting an optical signal having a wavelength $\lambda$ between about 1430 nm and 1530 nm to said gain fiber;

generating a pumping light from a pumping means operated at a wavelength $\lambda_p$;

pumping said gain fiber with said pumping light for amplifying said optical signal;

cascading said pumping light through said gain fiber a plurality of Raman orders, the wavelength $\lambda_p$ being such that an intermediate Raman order has a wavelength $\lambda_r$ at a close proximity to said zero-dispersion wavelength $\lambda_0$;

phase matching said intermediate Raman order with four-wave mixing (if $\lambda_r<\lambda_0$) or parametric amplification (if $\lambda_r>\lambda_0$) for spectral broadening; and outputting said amplified and spectrally broadened optical signal, wherein $\lambda \geq \lambda_0 \geq \lambda_r$.

* * * * *